(12) United States Patent
Yoakum et al.

(10) Patent No.: US 7,533,418 B1
(45) Date of Patent: May 12, 2009

(54) TOKENS FOR CONTACT INFORMATION

(75) Inventors: John H. Yoakum, Cary, NC (US);
Russell C. Coffin, Frisco, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 540 days.

(21) Appl. No.: 10/960,259

(22) Filed: Oct. 7, 2004

(51) Int. Cl.
G06F 17/30 (2006.01)
G06F 15/16 (2006.01)
H04N 7/16 (2006.01)
G06F 7/04 (2006.01)
H04L 9/32 (2006.01)

(52) U.S. Cl. .............................. 726/26; 726/9; 709/206; 709/227; 707/9

(58) Field of Classification Search ................. 726/9, 726/26; 709/227, 206; 707/9
See application file for complete search history.

(56) References Cited

U.S. PATENT DOCUMENTS

| | | | | |
|---|---|---|---|---|
| 5,764,736 | A * | 6/1998 | Shachar et al. | 379/93.09 |
| 6,633,311 | B1 * | 10/2003 | Douvikas et al. | 715/731 |
| 6,877,094 | B1 * | 4/2005 | DiGiorgio et al. | 713/176 |
| 6,889,213 | B1 * | 5/2005 | Douvikas et al. | 705/67 |
| 7,062,656 | B2 * | 6/2006 | Richards et al. | 713/185 |
| 2003/0043974 | A1 * | 3/2003 | Emerson, III | 379/88.13 |
| 2003/0063735 | A1 * | 4/2003 | Brockenbrough et al. | 379/245 |
| 2003/0163705 | A1 * | 8/2003 | Richards et al. | 713/182 |
| 2004/0181517 | A1 * | 9/2004 | Jung et al. | 707/3 |

OTHER PUBLICATIONS

Dawson, F. et al. "vCard MIME Directory Profile" (RFC 2426), Sep. 1998.*
Internet Mail Consortium. "vCard Overview", date unknown.*
Versit Consortium. "vCard: The Electronic Business Card, Version 2.1", Sep. 18, 1996.*
Versit Consortium. "vCard: The Electronic Business Card, Version 2.1 White Paper", Jan. 1, 1997.*
W3C. "A P3P Preference Exchange Language 1.0 (APPEL1.0)", W3C Working Draft Apr. 15, 2002, retrieved from <http://www.w3.org/TR/P3P-preferences/>.*
Schneier, Bruce. E-Mail Security: How to keep your electronic messages private, 1995 John Wiley & Sons, Inc., pp. 17-19 & 178.*

* cited by examiner

Primary Examiner—Michael J Simitoski
(74) Attorney, Agent, or Firm—Withrow & Terranova, P.L.L.C.

(57) ABSTRACT

The present invention provides for a sending communication client to create and send a token, which includes control indicia pertaining to contact information and communication rules for using the contact information for an associated user, to a receiving communication client. The communication rules control how receiving communication clients can use the contact information to initiate communications with the sending user, using one of the addresses or telephone numbers. The receiving communication client will keep certain, if not all, of the contact information and perhaps the communication rules inaccessible to a user of the receiving communication client; however, the receiving communication client can use the contact information to initiate communications with one of the communication clients of the sending user. As such, the sending user can keep contact information confidential, yet let certain parties use the information according to communication rules.

84 Claims, 6 Drawing Sheets

TOKENS FOR CONTACT INFORMATION

FIELD OF THE INVENTION

The present invention relates to controlling contact information, and in particular to providing a token including contact information and communication rules defining how the contact information can be used to contact an individual or entity.

BACKGROUND OF THE INVENTION

People naturally tend to collect contact information, including telephone numbers, email addresses, instant messaging addresses, street addresses, and the like, for entities and individuals to which communications may be initiated. Many of these contacts will include multiple telephone numbers for cellular, public switched telephone network, and Internet telephony devices, as well as multiple email or instant messaging addresses. Further, it is commonplace for people to change contact information, especially cellular telephone numbers and email and messaging addresses, fairly frequently. As such, contact information for a particular entity or individual may change fairly frequently, and address books containing such contact information may quickly become outdated. In addition to the difficulty in keeping contact information up to date, many entities and individuals are reluctant to share certain types of contact information, such as cellular telephone numbers and email addresses, to protect privacy, minimize interruptions, and in the case of email, avoid spam.

Accordingly, many users wish to disseminate contact information, but have no way of preventing abuse of the contact information. Further, many users would disseminate contact information if the use of the contact information could be limited or otherwise controlled based on the user's desires. As such, there is a need for a way to disseminate contact information while simultaneously controlling how the contact information is used by the recipient.

SUMMARY OF THE INVENTION

The present invention provides for a sending communication client to create and send a token, which includes control indicia pertaining to contact information and communication rules for using the contact information for an associated user, to a receiving communication client. Contact information may include addresses or telephone numbers for one or more communication clients, including systems, associated with the sending user. The communication rules control how receiving communication clients can use the contact information to initiate communications with the sending user, using one of the addresses or telephone numbers. The receiving communication client will keep certain, if not all, of the contact information and perhaps the communication rules inaccessible to a user of the receiving communication client; however, the receiving communication client can use the contact information to initiate communications with one of the communication clients of the sending user. As such, the sending user can keep contact information confidential, yet let certain parties use the information according to the communication rules. The control indicia may include the actual contact information and communication rules, or may contain a pointer to all or a portion of the contact information and communication rules.

The tokens may be delivered alone or in association with communications to the receiving communication client through any number of mechanisms, including via email, instant messaging, short messaging services, and caller identification. During operation, the receiving communication client will take the necessary steps to keep the contact information confidential. Further, the communication rules may provide expiration indicia to control expiration of the token or information associated therewith. The tokens may include public or private information, and different tokens may be used for public and private uses. To enhance security, the communication rules may require a user to enter a password prior to using the contact information. All or a portion of the information contained in the token may be encrypted by the sending communication client and decrypted by the receiving communication client to provide higher levels of data integrity.

When the control indicia includes a pointer to a device, such as an information database, for storing all or a portion of the contact information and communication rules, periodic updates may be provided to the device. As such, the receiving communication client or other clients having access to the information may receive updates from the device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to delivering a token, which includes or provides a pointer to contact information and communication rules for using the contact information, to a receiving communication client associated with the recipient of the contact information. The receiving communication client will obtain the contact information and communication rules for using the contact information from the token or from a remote location based on information in the token. When contact information is to be used, the receiving communication client will restrict use of the contact information according to the communication rules, which may control when the contact information may be used, from where the contact information may be used, from what type of device the contact information can be used, and the like. Use of the contact information may be associated with an expiration date or time, and may require a password or other type of authentication in order to use the contact information. Notably, the receiving communication client may be configured to restrict access to the contact information by the user of the receiving communication client, such that the contact information cannot be readily viewed or otherwise obtained for use that is not compliant with the communication rules. As such, the receiving communication client may be configured to control dissemination of contact information when communications are initiated, as well as limit information kept in call logs and the like. In essence, at least some of the contact information is not accessible to the user of the receiving communication client, but the receiving communication client may use the contact information, based on the communication rules, for communications to the entity or individual from which the token was received. Prior to delving into the details of the present invention, an overview of an exemplary communication environment in which the concepts of the present invention may be implemented is described.

Figure 1:
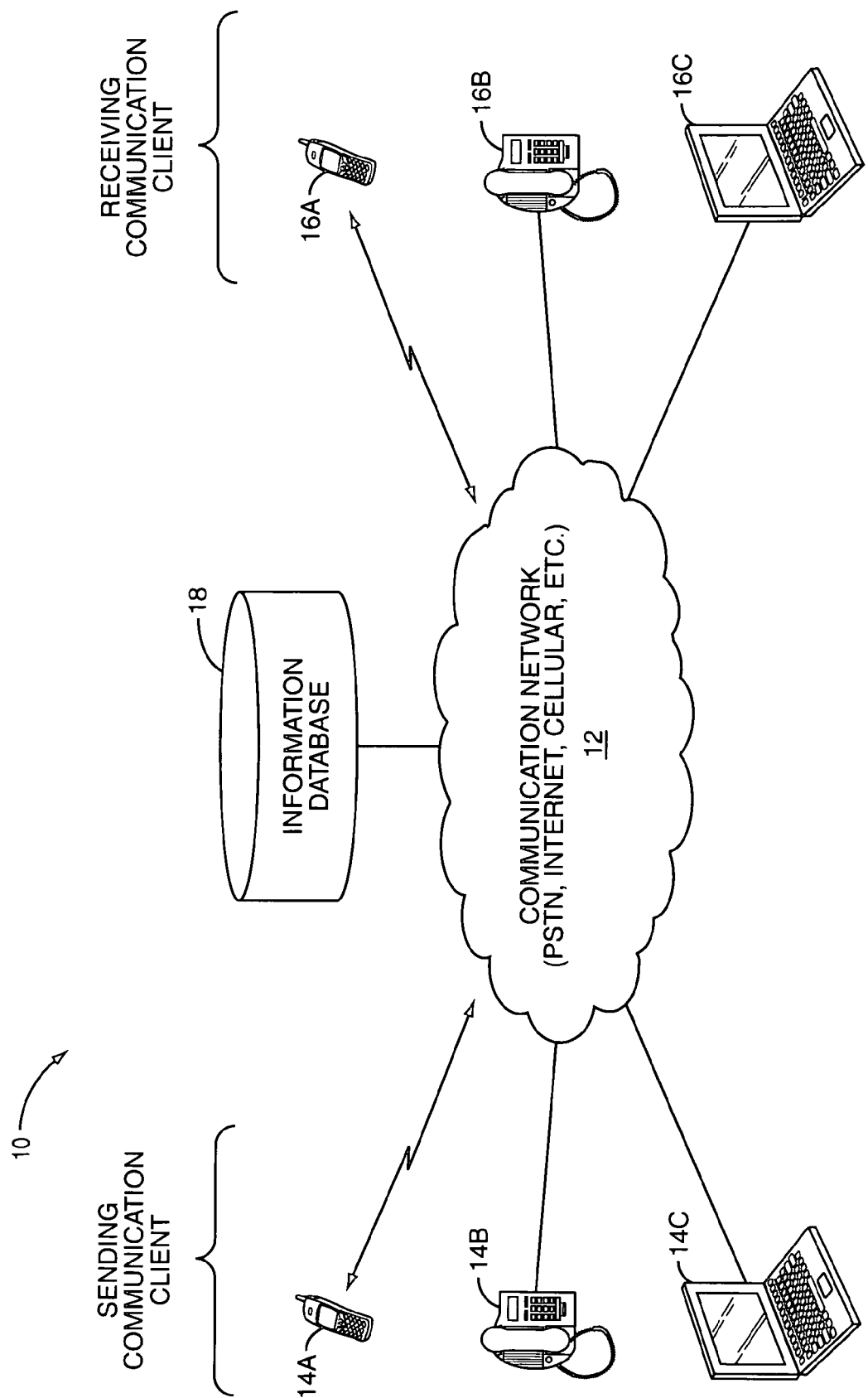
FIG. 1 is a block representation of a communication environment according to one embodiment of the present invention.

With reference to FIG. 1, a communication environment 10 is illustrated, wherein tokens are delivered over a communication network 12 from one or more sending communication clients 14A, 14B, 14C to one or more receiving communication clients 16A, 16B, 16C. The communication network 12 may represent one or more types of communication networks alone or in combination with others, and may include the Public Switched Telephone Network (PSTN), Internet, cellular network, or the like. The communication clients for sending or receiving the tokens may take many forms as illustrated to facilitate data, voice, video, or other communications ranging from but not limited to instant messaging and email, voice-based telephony calls, and any multimedia communications sessions.

In general, a sending user will be associated with various types of contact information and will establish communication rules to control how one or more of the receiving communication clients 16A, 16B, 16C are able to use the contact information to contact the sending user. The contact information and communication rules are delivered directly or indirectly in the form of a token from one of the sending communication clients 14A, 14B, 14C to one or more of the receiving communication clients 16A, 16B, 16C. In essence, the token will include control indicia, which includes the contact information and communication rules or a pointer to an information database 18, which may include all or a portion of the contact information and communication rules. Thus, some or all of the contact information and communication rules may be obtained from an information database 18 upon receiving the control indicia in the token. Those skilled in the art will recognize various amounts of information that may be maintained in the information database 18, depending on the desires of the users or service providers. Once the contact information and communication rules are obtained directly from the token or all or in part from the information database 18, the receiving communication client 16A, 16B, or 16C can use the contact information for communication to the sending user in light of the communication rules. In one embodiment, at least some of the contact information, and perhaps the communication rules, are not accessible by the receiving user to ensure the contact information is not disseminated or improperly used. In essence, the communication rules define a profile in which a sending user's contact information can be used by the receiving communication client 16A, 16B, or 16C. Notably, the tokens for a sending user may be received from a sending communication client 14A, 14B, or 14C associated with the sending user, or perhaps from the information database 18 or other device.

The tokens may be defined as public or private, wherein public tokens are readily available and may include information that is more generally considered publicly available. Communication rules may be associated with the public contact information, yet control of the contact information is limited due to its public availability. Private tokens will be considered more confidential and will include contact information that is not generally public, and as such, control of the contact information pursuant to the communication rules is more effective. A user may be associated with public and private tokens, wherein contact information from a public token may be used to contact a user to obtain a private token, which will include additional contact information and the associated communication rules for controlling use of the additional contact information. The tokens may be sent from one receiving communication client 16A, 16B, or 16C to another communication client associated with the receiving user; however, the communication rules may control such dissemination, if desired.

For enhanced security, the token or information associated therewith may require the use of a password. As such, the communication rules will require receipt of a password prior to allowing the receiving communication client 16A, 16B, or 16C to use the associated contact information and apply any of the remaining communication rules. Further, various encryption techniques may be used during delivery, receipt, storage, and usage of a token or any information associated therewith.

When all or a part of the contact information or communication rules are stored in the information database 18, the information database 18 may be updated when certain contact information or communication rules are updated or changed. As such, the receiving communication client 16A, 16B, or 16C may periodically request or otherwise receive updates from the information database 18 in an effort to minimize the need for the sending user to send a new token with new communication rules or contact information to the receiving user. However, updates may be provided by sending another token to one or more of the receiving communication clients 16A, 16B, or 16C, which will process the new token and update the contact information and communication rules as necessary.

Importantly, the token may be delivered through various types of networks in various forms. For example, the token may take the form of an electronic business card, which is associated with contact information and the communication rules for using the contact information. The communication rules may dictate how the contact information or sending user's identity is displayed in the address book contact listings. The tokens may also be delivered in other ways through email, instant messaging, short messaging service, session initiation messages, caller identification (CID), and the like through the corresponding Internet, cellular, or PSTN communication networks.

Figure 2A:
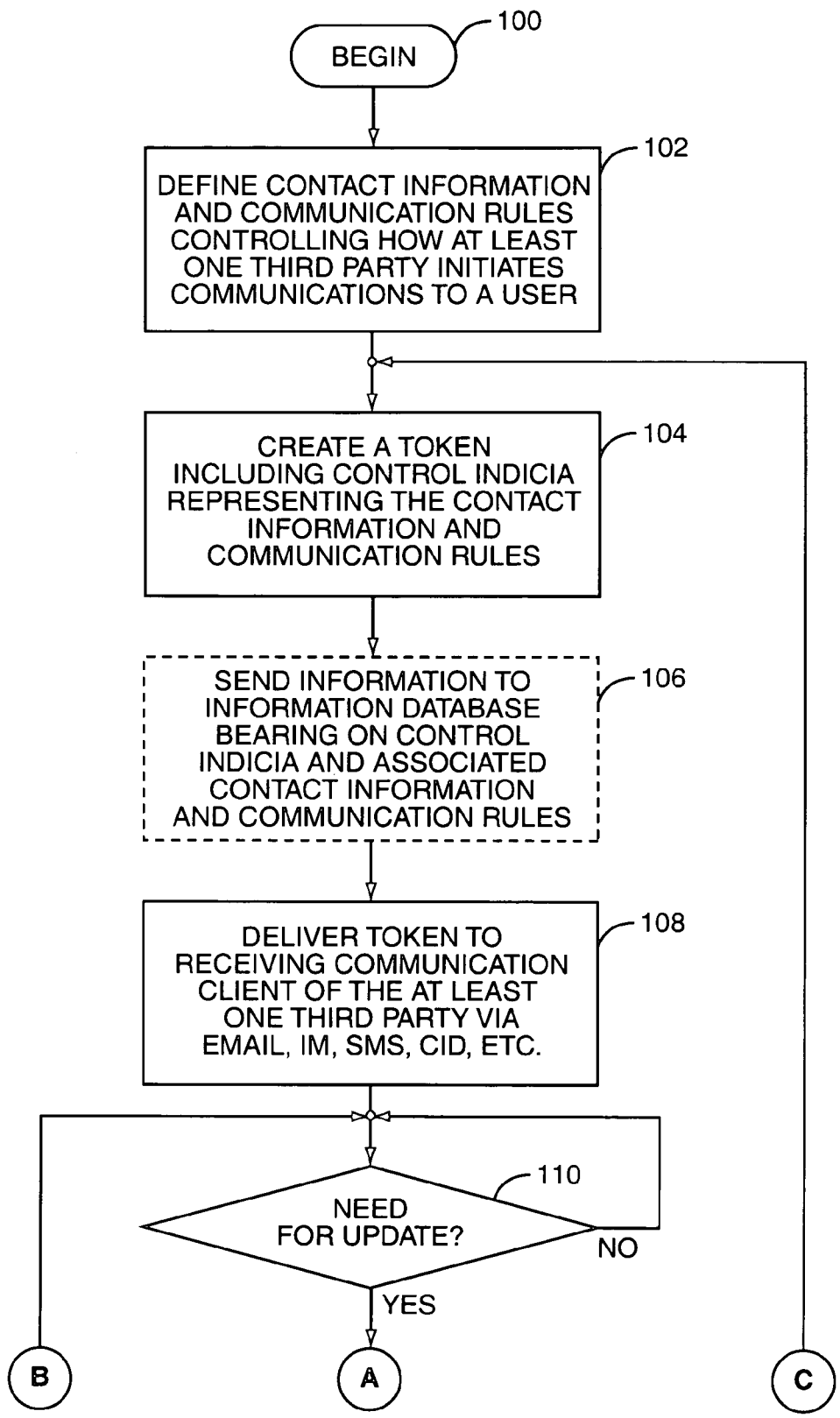
FIGS. 2A and 2B are a flow diagram illustrating the operation of a communication client that disseminates contact information, according to one embodiment of the present invention.
Figure 2B:
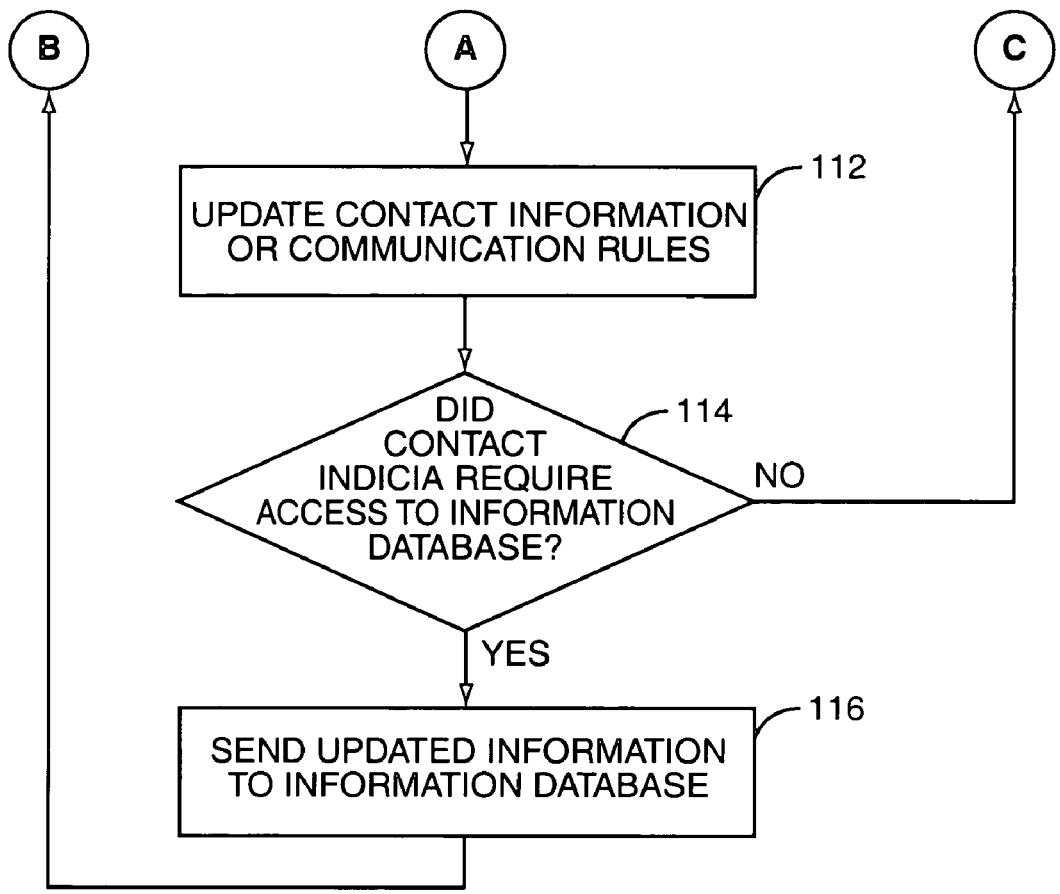

Turning now to FIGS. 2A and 2B, an exemplary operational flow is described according to one embodiment of the present invention from the perspective of a sending communication client 14. Initially, the process begins (step 100) wherein the contact information and communication rules are defined controlling how at least one third party initiates communications to a user associated with the sending communication client 14 (step 102). A token is then created including control indicia representing the contact information and the communication rules (step 104). The control indicia may actually include the contact information and communication rules in whole or in part. If all of the contact information or communication rules are not included, the control indicia will include a pointer, such as an address, to the information database 18. If the control indicia includes the pointer for at least some of the contact information or communication rules, the sending communication client 14 will send information to the information database 18 bearing on the control indicia and providing any of the necessary contact information and communication rules associated with the control indicia (step 106).

The sending communication client 14 will then deliver the token to one of the receiving communication clients 16 (step 108). The token may be delivered in association with the communication session or in association with delivery of a message to the receiving communication client 16, as well as being delivered solely for the sake of delivery of the token. The token may be delivered as part of or as an attachment to an email, instant message, short message service message, or the like, as well as in session initiation or caller identification information provided in association with a multimedia session or telephony call.

After a token has been delivered, the sending communication client 14 may determine whether there is a need to store or update any contact information or communication rules that are associated with the delivered token or other tokens previously sent (step 110). Notably, a sending user may have only one token that is provided to all recipients, or specially configured tokens for different recipients. In either case, if there is a need for an update (step 110), the sending communication client 14 will update the contact information or communication rules, as the case requires (step 112). If the information database 18 is used to store some or all of the contact information and communication rules (step 114), the sending communication client 14 will send updated information to the information database 18 to update the existing contact information and communication rules (step 116). Otherwise, a new token is created and delivered to the receiving communication client or clients 16 (steps 104-108).

Figure 3:
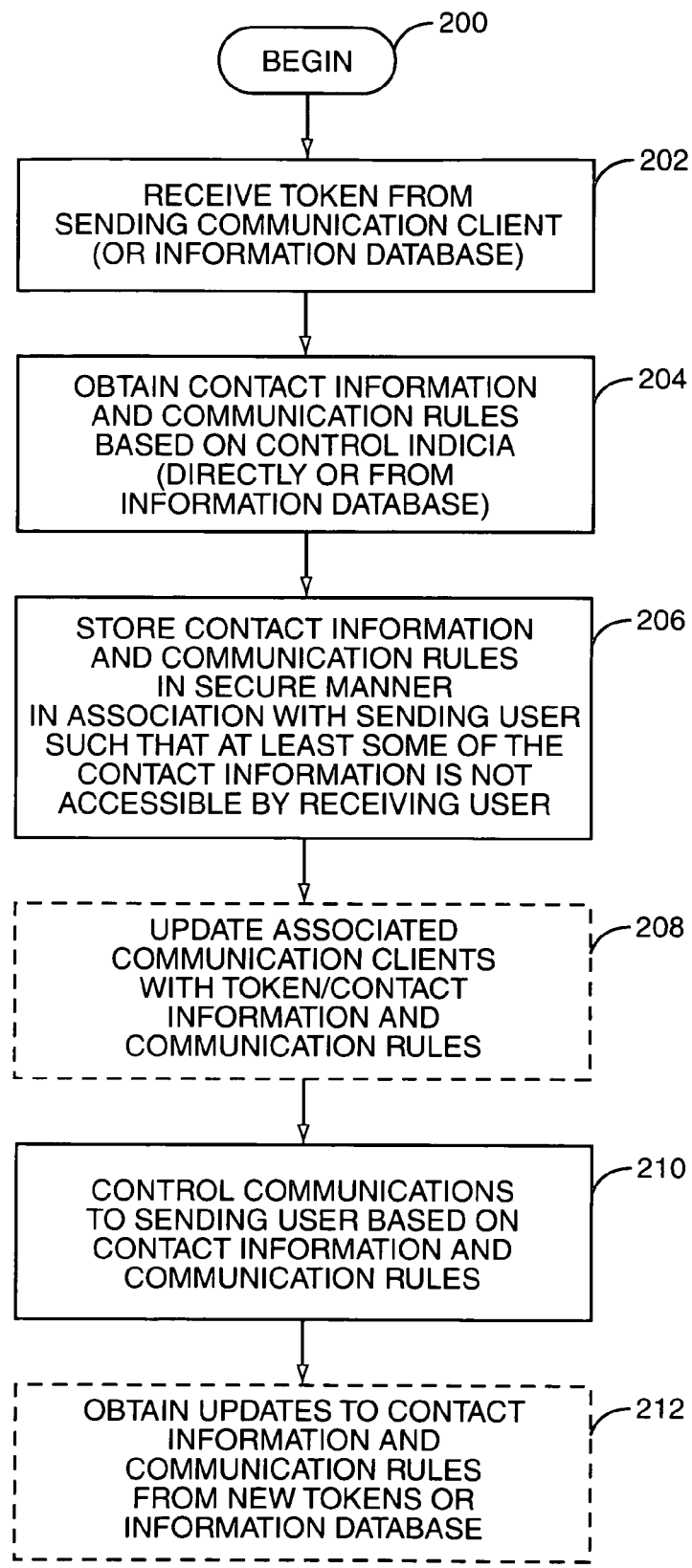
FIG. 3 is a flow diagram illustrating the operation of a communication client that receives contact information, according to one embodiment of the present invention.

With reference to FIG. 3, the operation of an exemplary embodiment of a receiving communication client 16 is provided. Operation begins (step 200) when the receiving communication client 16 receives the token from a sending communication client 14, information database 18, or other communication entity (step 202). The receiving communication client 16 will extract the contact information and the communication rules based on the control indicia, directly or indirectly via the information database 18 (step 204). The receiving communication client 16 will store the contact information and the communication rules in a secure manner in association with the sending user, such that at least some of the contact information is not accessible by the receiving user associated with the receiving communication client 16 (step 206). The receiving communication client 16 may be affiliated with other receiving communication clients 16, and may take the necessary steps to update associated communication clients 16 with the token or obtained contact information and communication rules, assuming the communication rules allow such activity (step 208).

At this point, the receiving communication client 16 is armed with contact information associated with the sending user and communication rules for controlling how the contact information may be used. As such, the receiving communication client 16 will control communications to the sending user based on the contact information and the communication rules (step 210). The receiving communication client 16 may obtain updates to the contact information and communication rules for the sending user from new tokens or from the information database 18 or other appropriate service (step 212).

The communication rules may operate to control communications in any number of ways. These methods may include but are not limited to controlling what contact information may be displayed or used, when all or certain contact information may be used, where all or certain contact information may be used, and from what type of communication devices the contact information may be used. Further, various combinations of these factors may be combined to provide various profiles controlling communications to the sending user. The communication rules as well as the contact information may be associated with an expiration date or time, and the token or information contained therein may be encrypted as well as associated with a password or other authentication indicia that must be provided by the receiving user prior to initiating communications using the contact information. The communication rules may provide a priority in which different contact numbers or addresses should be used when attempting to contact a sending user. For example, the communication rules may dictate that communications are initially provided using email, and if email fails, communications may be initiated through a short messaging service message or a call to the sending user's cellular telephone. Those skilled in the art will recognize various ways in which the communication rules may be used to establish profiles for controlling communications to the sending user.

To ensure confidentiality, the receiving communication client 16 must take the necessary steps to keep the receiving user from being able to readily access all or some of the contact information, and perhaps the associated communication rules. Further, outgoing call logs may need to be modified or blocked with respect to entries associated with the sending user. Additionally, communications initiated to the sending user may need to be modified to provide instructions to keep the sending user's information confidential if there is some way in which other users may be able to access the sending user's contact information. The sending user may be an entity or an individual. When it is an individual, the individual may be associated with a role wherein different people may assume that role at any given time, yet the communication rules and contact information remain the same.

Again, the token may provide information that may be considered private or public. The tokens may include both private and public information, wherein the private information is maintained in confidence and the public information is readily accessible. Alternatively, a token may include only public information or only private information. When control information dictates that access to the information database 18 is required to obtain the requisite contact information and communication rules for operation, control information may or may not contain some contact information or communication rules. In essence, the receiving communication client 16 and the information database 18 must be able to process the control information received in the token to determine the necessary contact information and communication rules intended to be provided by the sending user.

Figure 4:
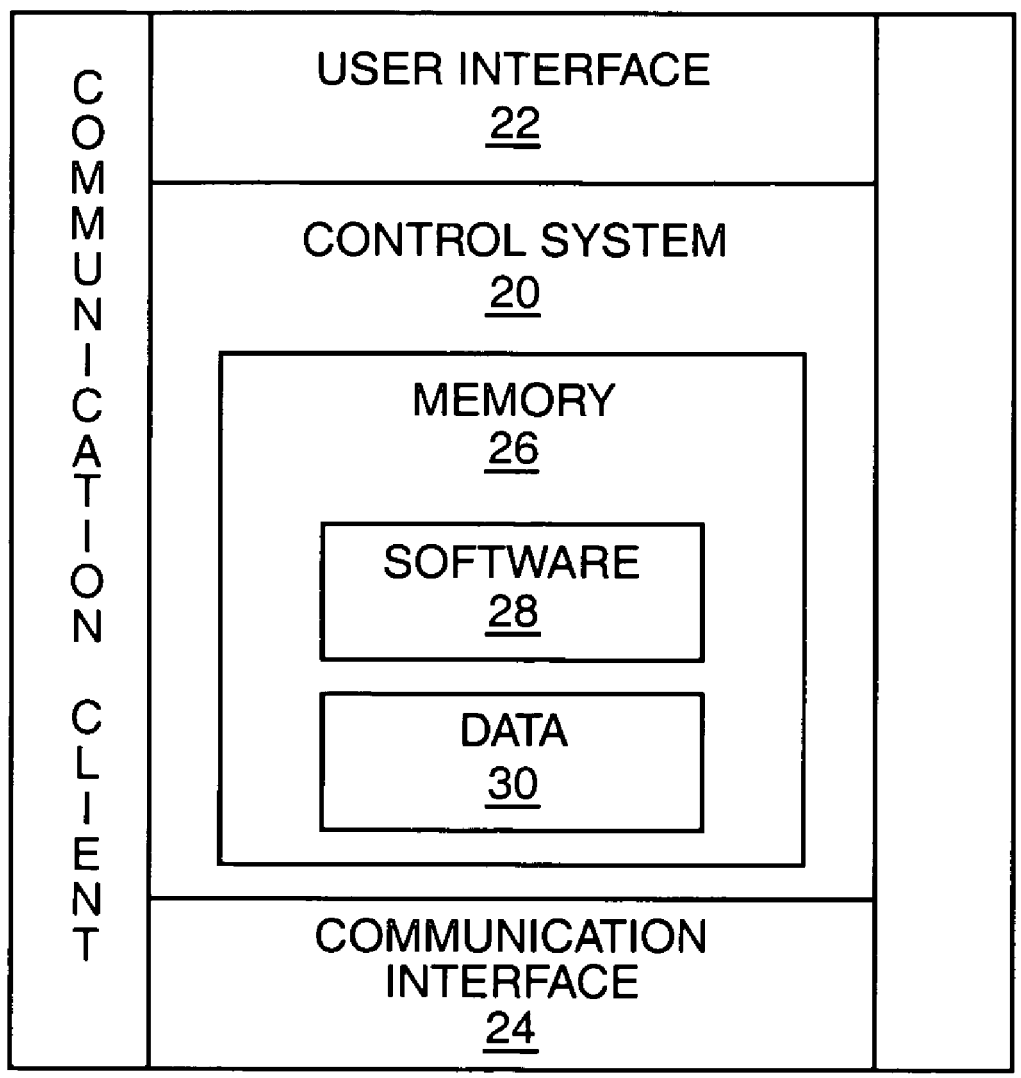
FIG. 4 is a block representation of a generic communication client according to one embodiment of the present invention.

The communication clients, which may include any of the sending communication clients 14 as well as the receiving communication clients 16, may take many forms, one of which is illustrated in a generic fashion in FIG. 4. The communication client of FIG. 4 may include a control system 20 associated with a user interface 22 and a communication interface 24. The user interface 22 may provide an interactive interface to receive user input as well as provide information to the user, wherein the communication interface 24 facilitates communications directly or indirectly with the communication network 12. The control system 20 will be associated with memory 26 for storing the software 28 required to facilitate operation as described above, as well as any required data 30.

Figure 5:
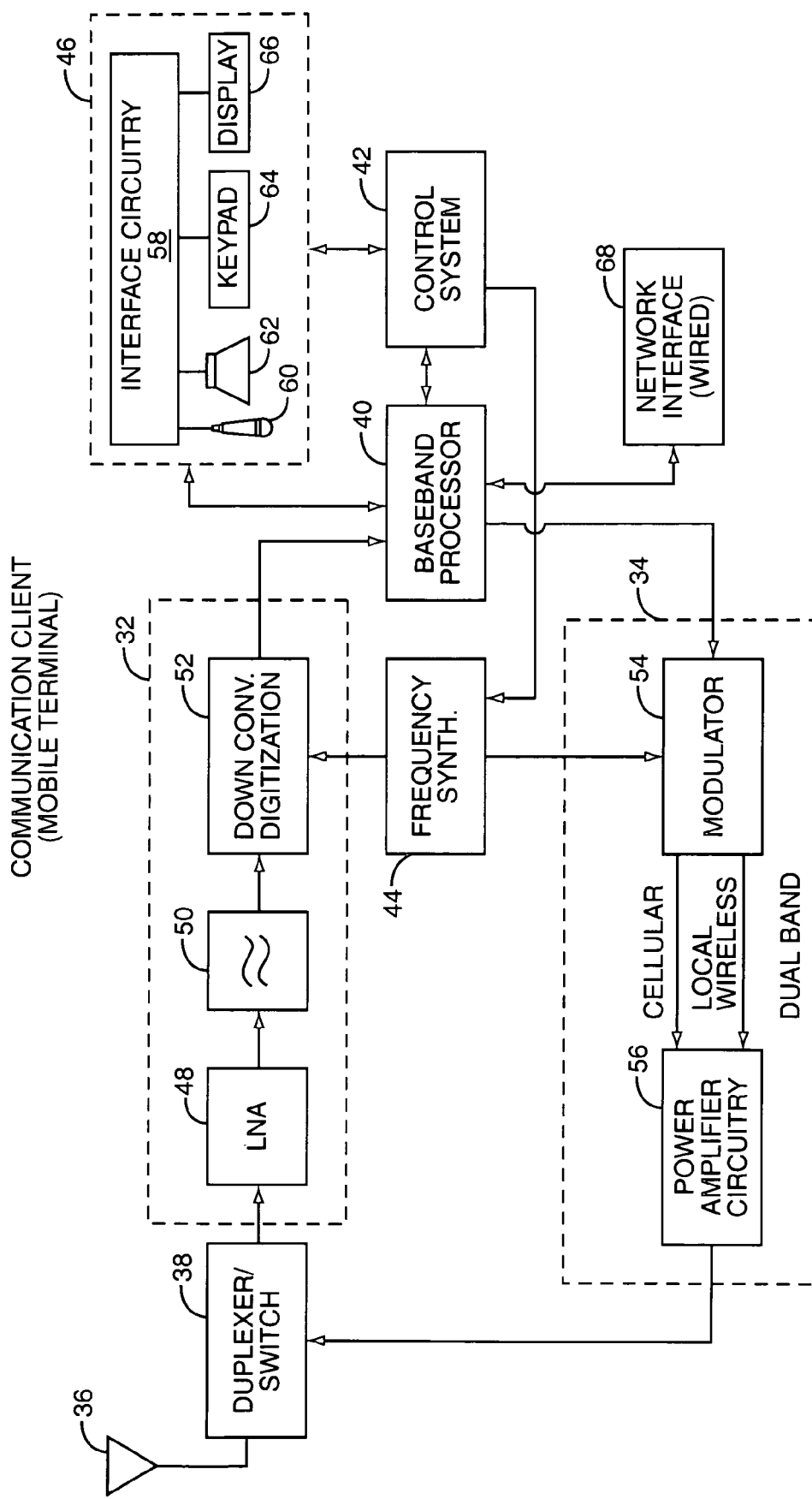
FIG. 5 is a block representation of a wireless communication client according to one embodiment of the present invention.

Turning now to FIG. 5, a communication client such as a mobile terminal is illustrated. The illustrated mobile terminal is capable of facilitating local wireless communications as well as cellular communications, wherein the local wireless communications are those supported over a limited range, such as those implementing the IEEE's 802.11 and Bluetooth local wireless communication standards. The basic architecture of the mobile terminal may include a receiver front end 32, a radio frequency transmitter section 34, an antenna 36, a duplexer or switch 38, a baseband processor 40, a control system 42, a frequency synthesizer 44, and a user interface 46. The receiver front end 32 receives information bearing radio frequency signals from one or more remote transmitters provided by a base station. A low noise amplifier 48 amplifies the signal. A filter circuit 50 minimizes broadband interference in the received signal, while downconversion and digitization circuitry 52 downconverts the filtered, received signal to an intermediate or baseband frequency signal, which is then digitized into one or more digital streams. The receiver front end 32 typically uses one or more mixing frequencies generated by the frequency synthesizer 44. The baseband processor 40 processes the digitized received signal to extract the information or data bits conveyed in the received signal. This processing typically comprises demodulation, decoding, and error correction operations. As such, the baseband processor 40 is generally implemented in one or more digital signal processors (DSPs).

On the transmit side, the baseband processor 40 receives digitized data, which may represent voice, data, or control information, from the control system 42, which it encodes for transmission. The encoded data is output to the transmitter 34, where it is used by a modulator 54 to modulate a carrier signal that is at a desired transmit frequency. Power amplifier circuitry 56 amplifies the modulated carrier signal to a level appropriate for transmission, and delivers the amplified and modulated carrier signal to the antenna 36 through the duplexer or switch 38. The control system 42 will operate to provide the functions described above that embody the concepts of the invention. The control system 42 may be integrated or distributed among different processing circuitry.

As noted above, the mobile terminal may be able to communicate wirelessly with the local wireless access points as well as with a cellular network via one or more base stations. Accordingly, the receiver front end 32, baseband processor 40, and radio frequency transmitter section 34 cooperate to provide either a wireless interface for the cellular network or the local wireless interface for the local wireless access points. These functions may be implemented using redundant circuitry, or by configuring common circuitry to operate in different modes. The configuration of the mobile terminal will be dictated by economics and designer choice. Further, the functionality of the mobile terminal, as described above will be controlled by the control system 42 in association with these systems.

A user may interact with the mobile terminal via the interface 46, which may include interface circuitry 58 associated with a microphone 60, a speaker 62, a keypad 64, and a display 66. The interface circuitry 58 typically includes analog-to-digital converters, digital-to-analog converters, amplifiers, and the like. Additionally, it may include a voice encoder/decoder, in which case it may communicate directly with the baseband processor 40. The microphone 60 will typically convert audio input, such as the user's voice, into an electrical signal, which is then digitized and passed directly or indirectly to the baseband processor 40. Audio information encoded in the received signal is recovered by the baseband processor 40, and converted by the interface circuitry 58 into an analog signal suitable for driving the speaker 62. The keypad 64 and display 66 enable the user to interact with the mobile terminal, input numbers to be dialed, access and select addresses or dialing plans, select from a number of available networks to use for communications, as well as provide traditional control of the mobile terminal.

In addition to or in lieu of the local wireless and cellular interfaces, the mobile terminal may have other communication interfaces, such as a wired network interface 68, to facilitate communications using various communication technologies. Those skilled in the art will recognize the numerous types of communication interfaces available for the present invention.

Those skilled in the art will recognize improvements and modifications to the preferred embodiments of the present invention. All such improvements and modifications are considered within the scope of the concepts disclosed herein and the claims that follow.

What is claimed is:

1. A method comprising:
receiving at a receiving communication client a token comprising control indicia representing contact information for a first user and communication rules defining how the contact information may be used by a second user; and
controlling communications with the first user such that at least some of the contact information is not accessible by the second user, but is useable by the receiving communication client to initiate communications to the first user pursuant to the communication rules,
wherein the control indicia comprises a pointer providing an address for a device; and
wherein at least a portion of the contact information and the communication rules are received from the device.

2. The method of claim 1 wherein the control indicia comprises the contact information and the communication rules.

3. The method of claim 1 further comprising receiving updates for certain of the contact information or the communication rules such that updated contact information or communication rules are available to the receiving communication client.

4. The method of claim 1 wherein at least a portion of the token is received in an encrypted format and further comprising decrypting the at least a portion of the token.

5. The method of claim 1 wherein the control indicia is associated with a password and the second user must provide the password prior to initiating communications to the first user.

6. The method of claim 1 wherein the communication rules provide expiration indicia defining an expiration time or date for at least one of the contact information and communication rules.

7. The method of claim 1 wherein the contact information provides an address or number for a plurality of communication clients associated with the first user and the communication rules provide rules for controlling initiation of communications with at least one of the plurality of communication clients.

8. The method of claim 7 wherein the rules control initiation of communications with at least two of the plurality of communication clients.

9. The method of claim 1 wherein the first user is associated with a role, which is assumed by at least one of a plurality of people at any given time.

10. The method of claim 1 wherein the first user is an individual.

11. The method of claim 1 wherein the first user is an entity.

12. The method of claim 1 wherein the token is received in association with a communication from a sending communication client associated with the first user to the receiving communication client.

13. The method of claim 1 wherein the token is received by the receiving communication client via an email.

14. The method of claim 1 wherein the token is received by the receiving communication client via a messaging service.

15. The method of claim 1 wherein the token is received by the receiving communication client via instant messaging.

16. The method of claim 1 wherein the token is received by the receiving communication client via caller identification.

17. The method of claim 1 wherein the token is received in a session initiation message.

18. The method of claim 1 wherein the token is a public token comprising publicly available information.

19. The method of claim 1 wherein the token is a private token comprising information that is not publicly available.

20. A method comprising:
receiving at a receiving communication client a token comprising control indicia representing contact information for a first user and communication rules defining how the contact information may be used by a second user; and
controlling communications with the first user such that at least some of the contact information is not accessible by the second user, but is useable by the receiving communication client to initiate communications to the first user pursuant to the communication rules,
wherein the contact information provides an address or number for a plurality of communication clients associated with the first user and the communication rules provide rules for controlling initiation of communications with at least one of the plurality of communication clients, and
wherein a priority is associated with at least two of the plurality of communication clients.

21. A communication client comprising:
at least one communication interface;
a user interface; and
a control system associated with the at least one communication interface and the user interface and adapted to:
receive a token comprising control indicia representing contact information for a first user and communication rules defining how the contact information may be used by a second user; and
control communications with the first user such that at least some of the contact information is not accessible by the second user, but is useable to initiate communications to the first user pursuant to the communication rules,
wherein the control indicia comprises a pointer providing an address for a device; and
wherein the control system is further adapted to receive at least a portion of the contact information and the communication rules from the device.

22. The communication client of claim 21 wherein the control indicia comprises the contact information and the communication rules.

23. The communication client of claim 21 wherein the control system is further adapted to receive updates for certain of the contact information or the communication rules such that updated contact information or communication rules are available.

24. The communication client of claim 21 wherein at least a portion of the token is received in an encrypted format and the control system is further adapted to decrypt the at least a portion of the token.

25. The communication client of claim 21 wherein the control indicia is associated with a password and the second user must provide the password at the communication client prior to initiating communications to the first user.

26. The communication client of claim 21 wherein the communication rules provide expiration indicia defining an expiration time or date for at least one of the contact information and communication rules.

27. The communication client of claim 21 wherein the contact information provides an address or number for a plurality of communication clients associated with the first user and the communication rules provide rules for controlling initiation of communications with at least one of the plurality of communication clients.

28. The communication client of claim 27 wherein the rules control initiation of communication with at least two of the plurality of communication clients.

29. The communication client of claim 27 wherein a priority is associated with at least two of the plurality of communication clients.

30. The communication client of claim 21 wherein the first user is associated with a role, which is assumed by at least one of a plurality of people at any given time.

31. The communication client of claim 21 wherein the first user is an individual.

32. The communication client of claim 21 wherein the first user is an entity.

33. The communication client of claim 21 wherein the token is received in association with a communication from a sending communication client associated with the first user to the receiving communication client.

34. The communication client of claim 21 wherein the token is received by the communication client via an email.

35. The communication client of claim 21 wherein the token is received by the communication client via a messaging service.

36. The communication client of claim 21 wherein the token is received by the receiving communication client via instant messaging.

37. The communication client of claim 21 wherein the token is received by the receiving communication client via caller identification.

38. The communication client of claim 21 wherein the token is received in a session initiation message.

39. The communication client of claim 21 wherein the token is a public token comprising publicly available information.

40. The communication client of claim 21 wherein the token is a private token comprising information that is not publicly available.

41. A method comprising:
creating a token comprising control indicia representing contact information for a first user and communication rules defining how the contact information may be used by a second user; and effecting delivery of the token to a receiving communication client of the second user, wherein the token is processed by the receiving communication client such that at least some of the contact information is not accessible by the second user, but is useable by the receiving communication client to initiate communications to the first user pursuant to the communication rules, wherein the control indicia comprises a pointer providing an address for a device from which at least a portion of the contact information and the communication rules are obtained by the receiving communication client.

42. The method of claim 41 wherein the control indicia comprises the contact information and the communication rules.

43. The method of claim 41 further comprising effecting delivery of the at least a portion of the contact information and the communication rules to the device, which is adapted to provide the at least a portion of the contact information and the communication rules to the receiving communication client.

44. The method of claim 43 further comprising providing updates for certain of the contact information or the communication rules and effecting delivery of the updates to the device such that updated contact information or communication rules are provided to the receiving communication client.

45. The method of claim 41 further comprising encrypting at least a portion of the token such that the token is delivered in an encrypted format.

46. The method of claim 41 wherein the control indicia is associated with a password and the second user must provide the password at the receiving communication client prior to initiating communications to the first user.

47. The method of claim 41 wherein the communication rules provide expiration indicia defining an expiration time or date for at least one of the contact information and communication rules.

48. The method of claim 41 wherein the contact information provides an address or number for a plurality of communication clients associated with the first user and the communication rules provide rules for controlling initiation of communications with at least one of the plurality of communication clients.

49. The method of claim 48 wherein the rules control initiation of communication with at least two of the plurality of communication clients.

50. The method of claim 48 wherein a priority is associated with at least two of the plurality of contacts.

51. The method of claim 41 wherein the first user is associated with a role, which is assumed by at least one of a plurality of people at any given time.

52. The method of claim 41 wherein the first user is an individual.

53. The method of claim 41 wherein the first user is an entity.

54. The method of claim 41 wherein the token is delivered in association with a communication from a sending communication client associated with the first user to the receiving communication client.

55. The method of claim 41 wherein the token is delivered to the receiving communication client via an email.

56. The method of claim 41 wherein the token is delivered to the receiving communication client via a messaging service.

57. The method of claim 41 wherein the token is delivered to the receiving communication client via instant messaging.

58. The method of claim 41 wherein the token is delivered to the receiving communication client via caller identification.

59. The method of claim 41 wherein the token is delivered in a session initiation message.

60. The method of claim 41 wherein the token is a public token comprising publicly available information.

61. The method of claim 41 wherein the token is a private token comprising information that is not publicly available.

62. A system comprising:
at least one communication interface;
a control system associated with the at least one communication interface and adapted to:
create a token comprising control indicia representing contact information for a first user and communication rules defining how the contact information may be used by a second user; and
effect delivery of the token to a receiving communication client of the second user, wherein the token is processed by the receiving communication client such that at least some of the contact information is not accessible by the second user, but is useable by the receiving communication client to initiate communications to the first user pursuant to the communication rules,
wherein the control indicia comprises a pointer providing an address for a device from which at least a portion of the contact information and the communication rules are obtained by the receiving communication client.

63. The system of claim 62 wherein the control indicia comprises the contact information and the communication rules.

64. The system of claim 62 wherein the control system is further adapted to effect delivery of the at least a portion of the contact information and the communication rules to the device, which is adapted to provide the at least a portion of the contact information and the communication rules to the receiving communication client.

65. The system of claim 64 wherein the control system is further adapted to provide updates for certain of the contact information or the communication rules and effect delivery of the updates to the device such that updated contact information or communication rules are provided to the receiving communication client.

66. The system of claim 62 wherein the control system is further adapted to encrypt at least a portion of the token such that the token is delivered in an encrypted format.

67. The system of claim 62 wherein the control indicia is associated with a password and the second user must provide the password at the receiving communication client prior to initiating communications to the first user.

68. The system of claim 62 wherein the communication rules provide expiration indicia defining an expiration time or date for at least one of the contact information and communication rules.

69. The system of claim 62 wherein the contact information provides an address or number for a plurality of communication clients associated with the first user and the communication rules provide rules for controlling initiation of communications with at least one of the plurality of communication clients.

70. The system of claim 69 wherein the rules control initiation of communication with at least two of the plurality of communication clients.

71. The system of claim 69 wherein a priority is associated with at least two of the plurality of contacts.

72. The system of claim 62 wherein the first user is associated with a role, which is assumed by at least one of a plurality of people at any given time.

73. The system of claim 62 wherein the first user is an individual.

74. The system of claim 62 wherein the first user is an entity.

75. The system of claim 62 wherein the token is delivered in association with a communication from a sending communication client associated with the first user to the receiving communication client.

76. The system of claim 62 wherein the token is delivered to the receiving communication client via an email.

77. The system of claim 62 wherein the token is delivered to the receiving communication client via a messaging service.

78. The system of claim 62 wherein the token is delivered to the receiving communication client via instant messaging.

79. The system of claim 62 wherein the token is delivered to the receiving communication client via caller identification.

80. The system of claim 62 wherein the token is delivered in a session initiation message.

81. The system of claim 62 wherein the token is a public token comprising publicly available information.

82. The system of claim 62 wherein the token is a private token comprising information that is not publicly available.

83. A computer readable media comprising software with instructions for a control system to:

receive a token comprising control indicia representing contact information for a first user and communication rules defining how the contact information may be used by a second user; and control communications with the first user such that at least some of the contact information is not accessible by the second user, but is useable to initiate communications to the first user pursuant to the communication rules, wherein the control indicia comprises a pointer providing an address for a device and at least a portion of the contact information and the communication rules are received from the device.

84. A computer readable media comprising software with instructions for a control system to:

create a token comprising control indicia representing contact information for a first user and communication rules defining how the contact information may be used by a second user; and effect delivery of the token to a receiving communication client of the second user, wherein the token is processed by the receiving communication client such that at least some of the contact information is not accessible by the second user, but is useable by the receiving communication client to initiate communications to the first user pursuant to the communication rules, wherein the control indicia comprises a pointer providing an address for a device and at least a portion of the contact information and the communication rules are received from the device.

\* \* \* \* \*